Jan. 16, 1968     L. R. ALEXANDER     3,364,070
FUEL CELL CONTROL SYSTEM
Filed May 18, 1961
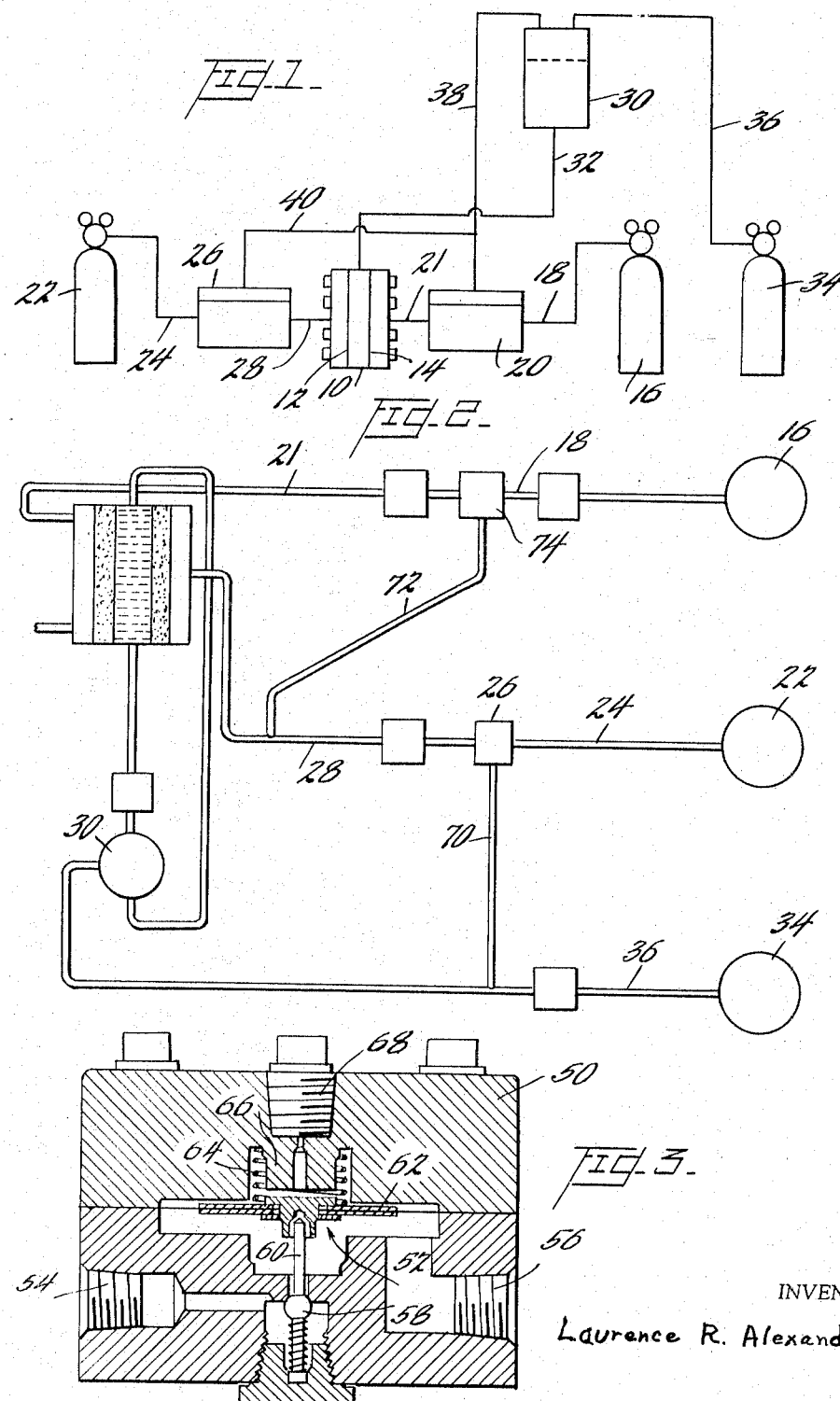
INVENTOR
Laurence R. Alexander
BY Watson, Cole, Grindle & Watson    ATTORNEY

United States Patent Office 3,364,070
Patented Jan. 16, 1968

3,364,070
FUEL CELL CONTROL SYSTEM
Laurence R. Alexander, New Rochelle, N.Y., assignor to Leesona Corporation, Cranston, R.I., a corporation of Massachusetts
Continuation-in-part of application Ser. No. 731,406, Apr. 28, 1958. This application May 18, 1961, Ser. No. 112,744
14 Claims. (Cl. 136—86)

This invention relates to fuel cells, and more particularly methods and means for establishing and maintaining a predetermined pressure relationship between the electrolyte of the cell and one or both of the fuel reagent and its oxidizing reagent. This application is a continuation-in-part of my co-pending application Ser. No. 731,406, now abandoned, filed Apr. 28, 1958, and entitled, "Fuel Cell Control System."

The present invention can be illustrated by reference to a fuel cell of the kind which employs porous nickel diffusion electrodes. Electrodes of this kind are generally made by sintering nickel powder to form a plate about 4 millimeters in thickness. The electrode is formed so that on one side the pore size is about 30 microns and the pore size on the other about 16 microns. Two electrodes of this kind are spaced apart about ⅛₆ of an inch, and a fluid electrolyte typically in the form of a solution, such as potassium hydroxide or lithium hydroxide, for such electrodes is circulated therebetween. The electrodes are arranged so that the sides having the pore size of about 16 microns are in contact with the electrolyte solution. On the other side of one of the electrodes (the anode) a fluid fuel reagent ordinarily in the form of a gas, such as hydrogen, is introduced under pressure. A fluid oxidizing reagent, which is also ordinarily a gas, such as oxygen, is introduced under pressure to the other side of the other electrode. It is desirable to maintain a small pressure difference across each electrode which permits the gases to fill the large pores on the gas side, but without bubbling through the small pores on the liquid side. The interior of the larger pores of the electrodes provide a large surface for absorption of the gas. The electrolyte migrates into the smaller pores of the electrodes and within the electrodes an interface is developed between the gases and the electrolyte itself. Due to the porous nature of the electrode a very large interface is provided, at which catalysis can readily occur. It is necessary that the interface between the electrolyte and the cell reactants be established within the electrode, so that the reactions which produce the usable current can occur. A fuel cell of the type described above is known to the art, and is described in this detail in order that the present invention may be understood. The present invention relates to the provision of method and means for establishing and maintaining the pressures of the electrolyte and reactants in such relationship as to create the above-described interface between the electrolyte and the cell reactants within the electrodes.

One of the objects of the invention is a fuel cell control system adapted to automatically regulate the pressure at which one or both of the cell reactants is supplied to the corresponding electrode of the cell with reference to the pressure at which the electrolyte is supplied to the electrode.

Another object of the present invention is to provide fuel cell control means which delivers both a fuel gas and its oxidizing gas to the cell at equal pressures and which automatically maintains this pressure slightly above that at which a liquid electrolyte is delivered and maintained.

Efficiency of a fuel cell is related to the temperature and pressure at which it is operated. It is sometimes desirable to alter the pressure as well as the temperature at which the fuel cell is operated, depending upon the nature of the load to which it is delivering power. It is, therefore, one of the objects of this invention to provide a simple, reliable fuel cell control method and means which is capable of establishing and maintaining a slight difference in pressure across the electrodes of the cell in any selected pressure range without requiring alterations in the control means or extensive adjustments.

Other advantages and objects of the invention will appear from the following detailed description of the forms of the invention shown and illustrated in the drawings. It will be understood that what is referred to herein as a fuel cell is more accurately an assembly of individual fuel cells into a battery. Each cell of the battery may be of the kind described above, or other types. The present invention is applicable to any fuel cell or battery in which it is necessary or desirable to establish an interface between two reactants within a porous or permeable material, which may or may not catalyze a reaction. In the accompanying drawings, a fuel battery is illustrated diagrammatically as having but a single cell, as the present invention would be applied in the same manner regardless of the number of cells which make up the battery.

In the accompanying drawings:

FIGURE 1 is a diagrammatic illustration of a fuel cell, its supply of fuel and oxidizing agent showing all these elements connected into a fuel cell control system according to the present invention;

FIGURE 2 is a diagrammatic illustration of a fuel cell, including its supplies of electrode reactants and electrolyte, all controlled by another form of the present invention; and FIGURE 3 is a vertical cross sectional view of a differential flow control element of the kind which may be used in the system shown in FIGURE 1.

FIGURE 1 of the drawings shows a fuel cell 10 having a positive electrode (cathode) 12, and a negative electrode (anode) 14. Where the reactants are gases these electrodes may be, and preferably are, of the kind described above having a pore size opening of about 30 microns on the gas side and about 16 microns on the electrolyte side. It will be understood, however, that the invention is not limited by the construction of the electrodes themselves, but is applicable to any cell in which it is desired to establish and maintain an interface between an electrolyte and the cell reactants within the electrodes. In the embodiment shown, the anode 14 is supplied with hydrogen under pressure from the container 16. This is conducted through the differential flow control 20 and thence through the line 21 to the outside of the anode. The cathode is supplied with oxygen which is stored under pressure in the container 22 and delivered to the cathode through the line 24 to the differential flow control 26 and thence through the line 28. The electrolyte for the cell, in this case a solution of potassium hydroxide for example, is supplied from the storage tank 30 through the line 32. It will be understood that the electrolyte is circulated through the cell, and means for accomplishing this are well understood in the art, and as they form no part of the present invention, are not illustrated or described further herein. A small differential pressure, say of three p.s.i., is maintained across the electrodes by means of the control gas which is stored in the container 34. This control gas may be nitrogen or some other suitable gas which is inert with respect to the system. The control gas is drawn from the container 34 at a control pressure of, say 600 p.s.i., and delivered through the line 36 to the electrolyte storage container 30. The pressure of 600 p.s.i. is thus applied to the electrolyte which is delivered to the cell 10 through the line 32. The control gas is also applied to the differential flow controllers 20 and 26 through the lines 38 and 40. These differential flow controllers may be of the conventional type illustrated in FIGURE 3 of the drawings.

Referring to FIGURE 3, the differential flow controller is illustrated as having a casing 50 consisting of two forgings which, when assembled, have a central cavity in which is positioned a spring-loaded diaphragm valve assembly. This valve assembly is generally indicated at 52. The casing is provided with a conduit for the reactant gas which has the entry port 54 and the exit port 56, communication between the two being controlled by the valve 58. The valve 58 is carried by the valve plunger 60 which, in turn, is operably associated with diaphragm assembly 62. The diaphragm assembly also includes the differential spring 64 which must be overcome in order that the valve 58 may be unseated. The upper end of this spring bears against the plug 66 which is an integral part of the upper casing and forms the bottom of the cavity 68 in the casing, into which the control gas is introduced. In the form of the invention illustrated, the differential spring yields to a pressure of three p.s.i. and, therefore, the reactant fluid introduced at the port 54 at a pressure of about 650 p.s.i. will be delivered from the exit port 56 at a pressure of 603 p.s.i. Both of the differential flow controllers 20 and 26 perform in this manner, so that the gases delivered to the cell through the lines 21 and 28 are both at a pressure of 603 p.s.i., as compared with the electrolyte which is delivered through the line 32 at a pressure of 600 p.s.i. It will be seen, therefore, that the hydrogen and oxygen are always three p.s.i. higher in pressure than the electrolyte regardless of fluctuations in the absolute pressure. In operation, this allows the oxygen and hydrogen supplied to be set at some pressure higher than the maximum operating pressure, and very little gas will flow to the cell at the low pressure of three p.s.i. until the control gas is applied. In this manner, the entrance of oxygen and hydrogen simultaneously and at the correct differential pressure, can be assured from the one control. Furthermore, the differential pressure can be lowered by raising the electrolyte reservoir with respect to the cell. The system as a whole assures flow of all components delivered to the cell in the right direction, and also allows picking arbitrarily the pressure at which the system is to be operated independently of the temperature and vapor pressure of the electrolyte.

In the form of the invention illustrated in FIGURE 2, the oxygen is delivered to the cell from the container 22 through the line 24, the differential regulator 26 and the line 28 in the same manner as explained in connection with FIGURE 1. Similarly, the control gas from the container 34 is delivered into the line 36 at a pressure of 600 p.s.i. in the reservoir 30. In this modification, however, the control gas is also delivered by a separate line 70 to the differential flow control 26. The differential spring in the flow controller 26 is set so that the oxygen is delivered into the line 28 at a pressure of 602 p.s.i. A branch 72 from this line delivers this pressure to the pressure equalizer 74 which is connected into the line 18 that conveys hydrogen from the container 16 to the flow equalizer. The function of the flow equalizer is to pass into the line 21 hydrogen which is at precisely the same pressure as the oxygen which is delivered to the cell through line 28. This flow equalizer is essentially the same as the differential flow controller illustrated in FIGURE 3, except that the differential spring 64 has been removed. The line 72 connects into the port 68 of the thus modified flow controller, and the hydrogen supply line 18 into the port 54. Consequently, the hydrogen delivered from the exit port 56 of the controller to the line 21 is at the same pressure as the oxygen in the line 28. In the form of invention shown in FIGURE 3, therefore, the same desirable results are achieved as is the system illustrated in FIGURE 1, with the further advantage that only one differential flow controller is required, and a single positive acting means is employed to assure that both gases will be delivered to the cell at precisely the same pressure.

From what has been said, it will be understood that the invention is concerned with providing a practical automatic control system for fuel cells rather than with improvements or modifications in the nature, function and basic operation of, and/or the electrochemical considerations involved in, the cell itself as well as its components and/or reactants. Consequently, the principles of the invention are not limited in applicability to the particular cell, the particular reactants, and/or the particular form of the reactants that have been shown and described, but extend to any cell utilizing a suitable fluid electrolyte and one or more suitable fluid reactants where it is advantageous to maintain the pressures thereof in some predetermined relationship. Moreover, although it is normally desired to maintain a pressure differential across the electrode, with the gas under a higher pressure than the liquid electrolyte, and the illustrative embodiment has been selected with this desideratum in mind, the system of the invention may be readily modified to maintain the respective reactants and the electrolyte in whatever pressure relationship that may be necessary or desirable under the conditions and considerations obtaining for a particular cell.

Having thus described the invention, what is claimed as new and desired to be secured by Letters Patent is:

1. In a fuel cell of the kind comprising an electrode, means for supplying a fluid electrolyte to one side thereof, means for supplying a fluid cell reactant under pressure to the other side, and a valve for regulating the pressure at which the cell reactant is delivered to said other side, the improvement which comprises a pressure responsive means having two sides each adapted to be subjected to pressure, said pressure responsive means being movable in the direction of the lower pressure when a difference in the pressures acting on said two sides occurs, a source of a control gas under pressure, means for applying the pressure of said control gas to one side of said pressure responsive means, means for applying the pressure of said control gas to said electrolyte supplying means, means for applying the pressure of said cell reactant to the other side of said pressure responsive means, and means controlled by the movement of said pressure responsive means to adjust said cell reactant regulating valve accordingly to vary the pressure on the delivery side of said regulating valve and thereby restore the pressures acting on the two faces of said pressure responsive means to a balanced condition.

2. A fuel cell as in claim 1 including means for applying a predetermined mechanical pressure to said on side of said pressure responsive means in addition to the pressure of said control gas, whereby the pressure of the cell reactant on the delivery side of said regulating valve is balanced against the total of the control gas pressure and said mechanical pressure.

3. A fuel cell as in claim 2 wherein said electrolyte is a liquid and said cell reactant is a gas.

4. In a fuel cell of the kind comprising an electrode, means for supplying a fluid electrolyte on one side thereof, means for supplying a fluid cell reactant under pressure on the other side and a valve for regulating the pressure at which the cell reactant is delivered to the cell, the improvement which comprises a pressure responsive means having two sides, each adapted to be exposed to pressure and operative in accordance with the difference in such pressure, means for actuating said cell reactant regulating valve in response to the operation of said pressure responsive means, a source of control gas under pressure, means for applying the pressure of said control gas both to the electrolyte and to one side of said pressure responsive means, and means for applying the pressure of said cell reactant on the delivery side of said valve to the other side of said pressure responsive means, whereby the pressure of the cell reactant is determined by reference to the pressure at which the electrolyte is supplied to the cell.

5. A fuel cell as in claim 4 wherein said electrolyte is a liquid and said reactant is a gas.

6. In a fuel cell of the kind comprising an electrode, means for supplying a liquid electrolyte on one side thereof, means for supplying a cell gas on the other and a valve for regulating the pressure at which the cell gas is delivered to the cell, the improvement which comprises a pressure responsive means having two sides adapted to be exposed to pressure, said pressure responsive means being normally biased in the direction of one of its sides and adapted to move in the direction of the other of its sides when the pressure on said one side exceeds the pressure on said other side by the amount of the biasing force, said pressure responsive means being connected to said cell gas regulating valve to actuate the same when said pressure responsive means moves in said other direction; a source of control gas under pressure; means for applying the pressure of said control gas both to said electrolyte and to said other side of said pressure responsive means, the control gas pressure and biasing force thereby urging the pressure responsive means in the some direction; and means for applying the pressure of said cell gas on the delivery side of said regulating valve to said one side of said pressure responsive means to oppose said control gas pressure and biasing force, whereby said cell gas regulating valve is actuated when the pressure of said cell gas differs from the total of the control gas pressure and the biasing force.

7. A fuel cell as in claim 6 including a spring bearing against said other side of said pressure responsive means to normally bias the same in the direction of said one side thereof, said spring yielding under a predetermined force whereby the cell gas is supplied to the electrode at a pressure exceeding the control gas pressure by not more than the amount of said predetermined force.

8. A cell as in claim 7 including a direct mechanical connection between the pressure responsive means and the cell gas regulating valve.

9. In a fuel cell of the kind having porous electrodes, a fluid electrolyte in contact with one side of each of the electrodes, and means for supplying a fluid cell reactant under pressure from separate sources on the other side of each electrode, means for maintaining substantially the same pressure differential across each electrode including a conduit for one of said reactants from its source to the cell having a differential pressure control for establishing the pressure of the reactant delivered to the cell above that of a control gas delivered to said control, a second conduit for the other reactant from its source to the cell including regulating means for equalizing the pressure of the other reactant with that of a reference pressure delivered to said regulating means, a conduit communicating between the output side of said differential pressure control and said regulating means, whereby the pressure of said one reactant on the output side of said differential pressure control constitutes the reference pressure delivered to said regulating means so that the pressures of the cell reactants delivered to the cell are equalized, a source of control gas and means for applying the pressure of said control gas to said pressure control and to said electrolyte.

10. A fuel cell as in claim 9 wherein said electrolyte is a liquid and said reactants are gases.

11. A pressure control system, comprising: a fuel cell wherein two fluids chemically react with an electrolytic material to liberate electrical energy which can flow through an external electric circuit; supply means including two fluid fuels supplied for consumption in said fuel cell; differential pressure control valve means connected to said supply means and having separate controllable passages to allow said fuels to pass through said valve means; said controllable passages each being operated in response to a position of diaphragm means.

12. A pressure control system, comprising: a fuel cell wherein two gases chemically react with an electrolytic material to liberate electrical energy which can flow through an external electric circuit; supply means including two gas fuels supplied for consumption in said fuel cell; differential gas pressure control valve means connected to said supply means and having separate controllable passages to allow said gases to pass through said valve means; said controllable passages each being operated in response to a position of diaphragm means; and each of said gas fuels applying a pressure to said diaphragm means to position said diaphragm means to allow both gases to flow to said fuel cell at a pressure determined by the pressure of one of said gases; said diaphragm means constructed and arranged to close at least one of said passages to the flow of one of said gases upon loss of the other of said gases.

13. A pressure control system for a fuel cell wherein two fluids chemically react with an electrolytic material to liberate electrical energy which can flow through an external electric circuit comprising: a fuel cell and supply means including two fluid fuels supplied for consumption in said fuel cell; differential pressure control valve means connected to said supply means and having separate controllable passages to allow said fuels to pass to said valve means; said controllable passages each being operated in response to a position of a diaphragm; and each of said fluid fuels applying a pressure to opposite sides of said diaphragm to position said diaphragm, said diaphragm means constructed and arranged to allow both fuels to flow to said fuel cell at the same pressure.

14. A pressure control system for a fuel cell wherein two gases chemically react with an electrolytic material to liberate electrical energy which can flow through an external electric circuit comprising: a fuel cell and supply means including two gas fuels supplied for consumption in said fuel cell; a differential pressure control valve connected to said supply means and having separate controllable passages to allow said gases to pass to said valve; said controllable passages each being operated in response to a position of a diaphragm; and each of said gases applying a pressure to opposite sides of said diaphragm to position said diaphragm to allow both gases to flow to said fuel cell at a pressure determined by the pressure of one of said gases; said diaphragm means constructed and arranged to close at least one of said passages of the flow of one of said gases upon loss of gas pressure to the other said passage.

References Cited
UNITED STATES PATENTS

| | | | |
|---|---|---|---|
| 3,002,039 | 9/1961 | Bacon | 136—86 |
| 3,087,044 | 4/1963 | Thorsheim | 136—86 |
| 2,925,455 | 2/1960 | Eidensohn et al. | 136—86 |
| 2,638,920 | 5/1953 | Woodhull | 136—86 |

ALLEN B. CURTIS, *Primary Examiner.*

JOHN R. SPECK, JOHN H. MACK, *Examiners.*

H. FEELEY, *Assistant Examiner.*